United States Patent
Nishitani et al.

[11] Patent Number: 6,150,621
[45] Date of Patent: Nov. 21, 2000

[54] STEERING SWITCH MODULE

[75] Inventors: Keizo Nishitani; Toshifumi Okahira; Tomohiko Matsushita, all of Shizuoka, Japan

[73] Assignee: Yazaki Corporation, Tokyo, Japan

[21] Appl. No.: 09/197,575

[22] Filed: Nov. 23, 1998

[30] Foreign Application Priority Data

Nov. 21, 1997 [JP] Japan ..................................... 9-321408

[51] Int. Cl.[7] ...................................................... H01H 3/12
[52] U.S. Cl. ........................ 200/61.54; 200/345; 280/731
[58] Field of Search ............................... 200/314, 61.54, 200/345, 5 A; 280/731

[56] References Cited

U.S. PATENT DOCUMENTS

| | | | |
|---|---|---|---|
| 4,590,340 | 5/1986 | Koike et al. | 200/61.54 |
| 5,396,038 | 3/1995 | Yamada | 200/345 X |
| 5,432,684 | 7/1995 | Fye et al. | 200/314 X |
| 5,542,694 | 8/1996 | Davis | 200/61.54 X |
| 5,568,367 | 10/1996 | Park | 200/314 X |

FOREIGN PATENT DOCUMENTS 62-448  1/1987  Japan .

*Primary Examiner*—Renee Luebke
*Attorney, Agent, or Firm*—Sughrue, Mion, Zinn, Macpeak & Seas, PLLC

[57] ABSTRACT

A steering switch module mounted on a steering wheel for controlling electronic equipments disposed on a vehicle is disclosed. The module comprises a switch board on which a plurality of switches are provided to control the electronic equipments, a plurality of operation buttons for press-operating the switches, a holding member for holding so each of the operation buttons as to be capable of moving only in the press-operation direction, the holding member secured to the switch board, and a steering cover for covering the switch board and the holding member such that only the operation buttons are exposed.

7 Claims, 7 Drawing Sheets

STEERING SWITCH MODULE

BACKGROUND OF THE INVENTION

The present invention relates to a steering switch module for controlling electronic equipment mounted on an automobile or the like by operating a plurality of operation buttons provided on a steering wheel. More particularly, the present invention relates to a steering switch module which is improved so as to easily be attached to or removed from the steering wheel.

Conventionally, when electronic equipment, such as audio units, an airconditioner and a cruise control, mounted on an automobile or the like must be operated by a driver who is driving the automobile, if operation buttons are disposed on an instrument panel or a center console which is disposed apart from the driver, such a configuration inhibits the driver from easily operating the operation buttons. Moreover, the driver has to look away from a forward movement direction of the automobile.

Thus, there has been suggested a variety of steering switch modules in which the operation buttons are provided on the steering wheel, in particular, a pad portion thereof so the driver may operate the operation buttons easily while driving.

One example of such a steering switch module has been disclosed in Japanese Utility Model Publication No. Sho 62-448. As shown in FIG. 6, the steering switch module comprises: a casing 3 secured to a central portion 1 of a steering wheel by a magnet 2; and a plurality of operation buttons 6 provided on a switch board 4 disposed in the casing 3 to operate switches 5. The operation buttons 6 are respectively inserted into an insertion holes 7 formed in the casing 3 and then projects toward the driver while being held by the insertion holes 7.

When the above-mentioned steering switch module is inspected, the switch board 4 and the operation buttons 6 must be removed from the casing 3. However, since the operation buttons 6 are held by the insertion holes 7 formed in the casing 3 separation of the operation buttons 6 occurs during the removing operation. Therefore, there arises a problem in that the removing operation cannot easily be performed.

Besides, the steering switch module does not any means of illumination for the operation buttons 6. Therefore, there arises a problem of unsatisfactory operability of the operation buttons 6 during the night.

SUMMARY OF THE INVENTION

It is therefore an object of the present invention is to provide a steering switch module which can easily be attached to and detached from a steering wheel and with which operation buttons can easily and effectively be illuminated during the night.

In order to achieve the above object, there is provided a steering switch module mounted on a steering wheel for controlling electronic equipments disposed on a vehicle comprising: a switch board on which a plurality of switches are provided to control the electronic equipments; a plurality of operation buttons for press-operating the switches; a holding member for holding so each of the operation buttons as to be capable of moving only in the press-operation direction, the holding member secured to the switch board; and a steering cover for covering the switch board and the holding member such that only the operation switches are exposed.

In the module, the holding member includes a holder having support members for respectively supporting the associated operation switch and a holding frame for retaining the operation buttons collectively.

In the module, guide grooves are formed in one of the support members and the operation buttons, and engaging projections for slidably engaging with the associated guide grooves are provided on the other.

Accordingly, separation of the operation buttons during the attaching/detaching operation of the module can be prevented. Furthermore, since the plural operation buttons can collectively be attached to the switch board, the attaching/detaching operation can significantly easily be performed.

The steering switch module further comprises a light source for illuminating the operation switches. And the holder and the operation switches are made of a transparent medium.

In the module, a coating painting is applied to each of the operation switches so as to form an optical path such that a light beam emitted from the light source is capable of illuminating an operation face of the operation switch uniformly. For example, inner surfaces of the operation switches which contacts with the support members are painted in black, a reverse surface of the operation face is painted in white, and the operation face is smoke-painted.

Accordingly, the light beams emitted from the light source are transmitted to the operation buttons through the holder and the support member effectively and the operation buttons can be illuminated uniformly.

Furthermore, due to fact that the guide grooves are formed in one of the support members and the operation switches, and the engaging projections for slidably engaging with the associated guide grooves are provided on the other, contact areas of the holder and the operation buttons can be enlarged. As a result, light beams transmitted to the support members of the holder can reliably be transmitted to the operation buttons.

DETAILED DESCRIPTION OF THE PREFERRED EMBODIMENTS

One embodiment of a steering switch module according to the present invention will now be described with reference to FIGS. 1 to 5.

Figure 1:
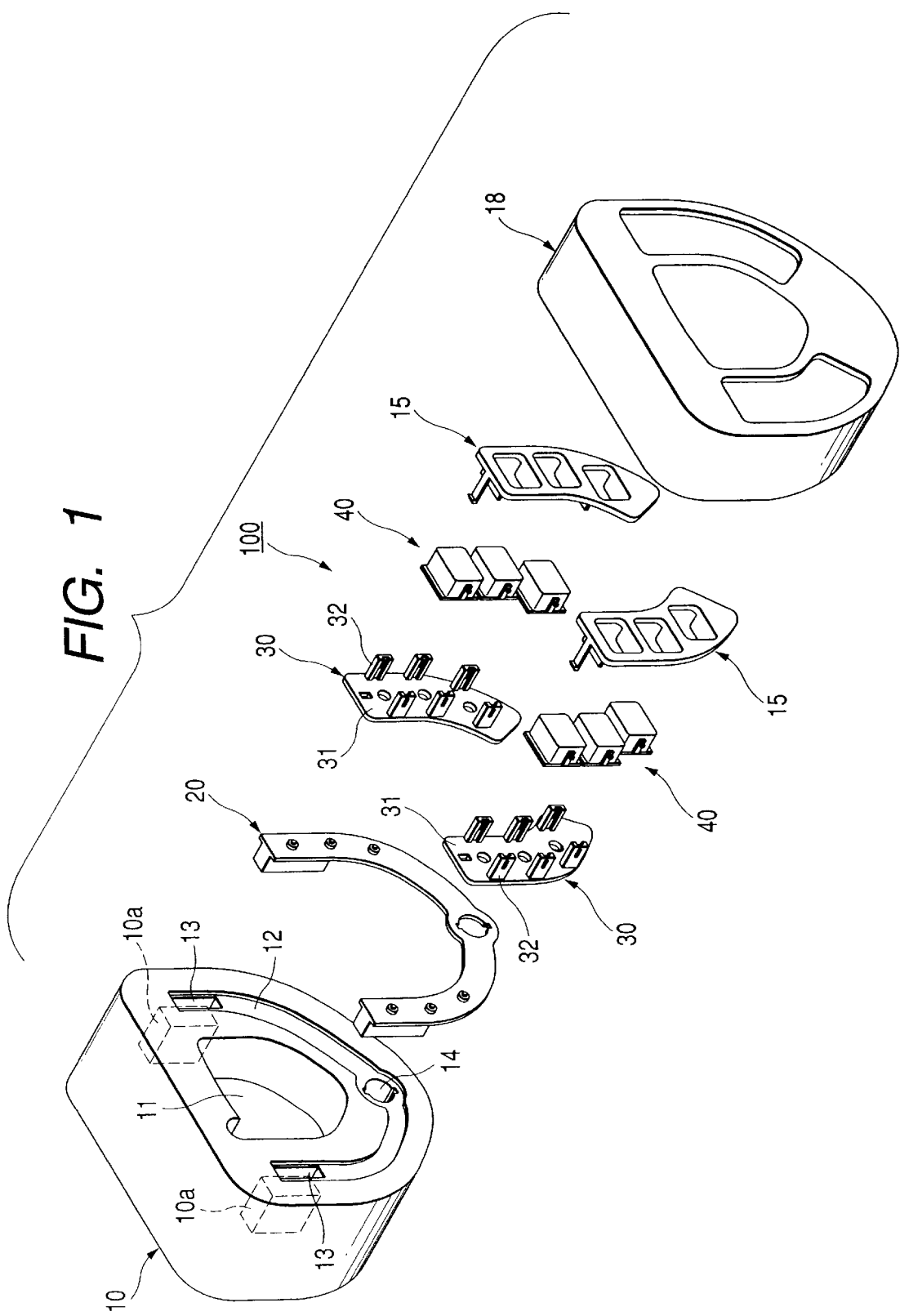
FIG. 1 is an overall perspective view showing a steering switch module according to one embodiment of the present invention.
Figure 2:
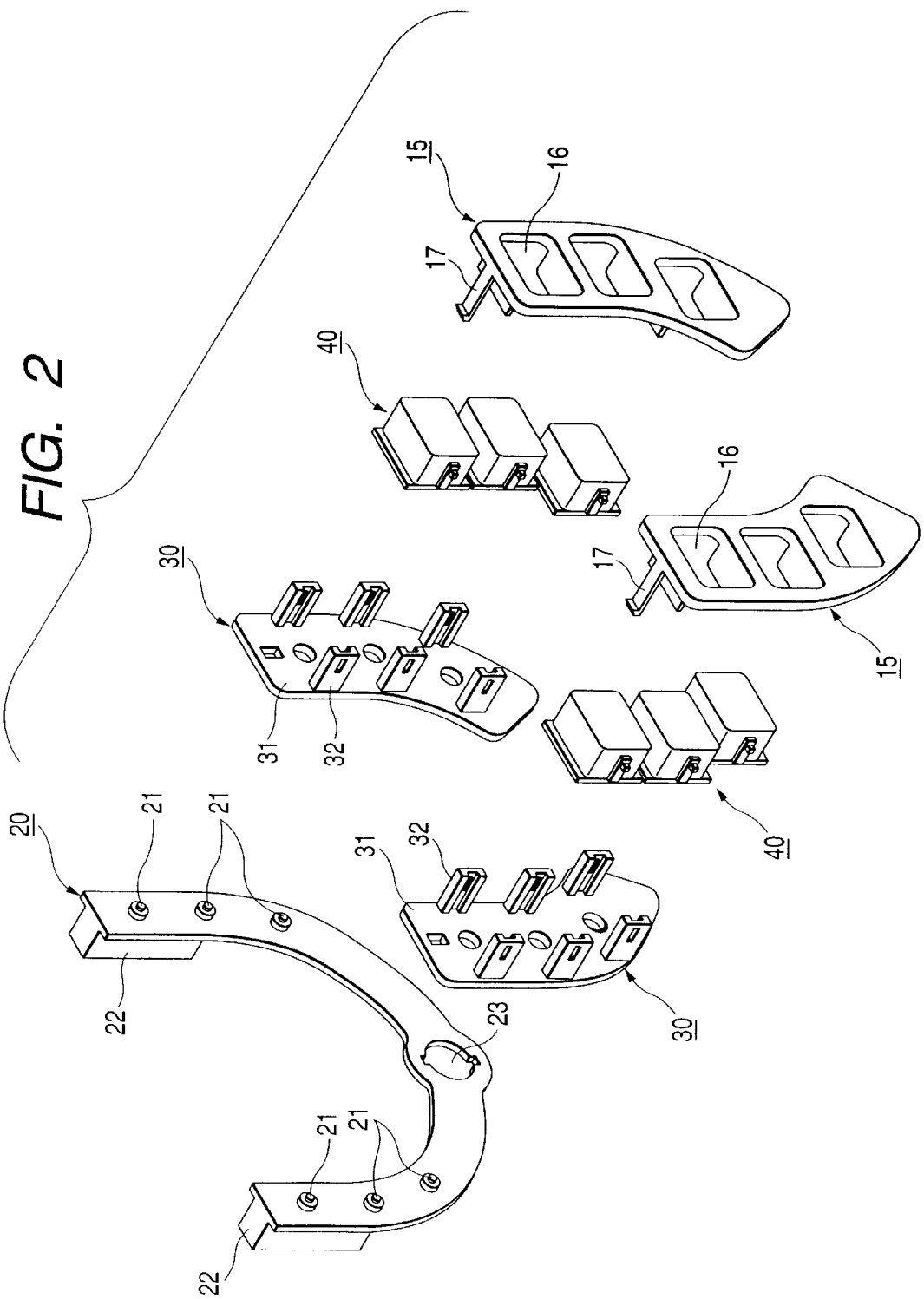
FIG. 2 is an enlarged perspective view showing an essential portion of the module shown in FIG. 1.

As shown in FIGS. 1 and 2, a steering switch module 100 according to the present embodiment is mounted on a pad 10 which is secured to a central portion of a steering wheel (not shown). The steering switch module 100 comprises a switch board 20 which is secured to the pad 10, six operation buttons 40 for press-operating six switches 21 provided on the switch board 20 for supporting the operation buttons 40 and a pair of right and left holders 30 secured such that it is inhibited relative displacement with respect to the switch board 20.

A pair of right and left holding frames (bezels) 15 are attached to the holders 30 so that gaps around the operation buttons 40 are closed after the apparatus has been assembled. The pad 10 is covered with the pad sheet 18 so that the steering switch module 100 mounted in the pad 10 is covered with the pad sheet 18.

The pad 10 is obtained by integrally injection-molding urethane foam, the pad 10 having a central cavity 11 which accommodates an inflator for an air bag (not shown). A U-shape groove 12 in which the switch board 20 is embedded and secured is formed in the surface on this side. Slits 13 for preventing rotation of the switch board 20 and securing the same are formed at right and left top ends of the groove 12. A bulb receiving hole 14 for receiving a bulb 19 is formed in the lower central portion of the groove 12 to serve as a light emitting member for illuminating the operation buttons 40 during the night.

As shown in FIG. 2, the switch board 20 is formed into a U-like shape when it is viewed from a front position. Six switches 21 are bilaterally symmetrically provided on the surface of the switch board 20 on this side in the drawing. The switches 21 are connected to a variety of electronic equipments, such as audio units, an airconditioner and a cruise control, through a wire harness (not shown). When the switches 21 are pressed in a direction in parallel with the axial line of the steering wheel, the switches 21 are switched on/off to control the electronic equipments.

Connectors 22 are projectingly provided at both top ends of the rear surface of the switch board 20. When the connectors 22 of the switch board 20 are inserted into the slits 13 of the pad 10, the switch board 20 can be engaged to pad-side connectors 10a formed in the pad 10.

To realize a function to serve as a light transmissive plate, the holders 30 are obtained by injection-molding a transparent resin material, such as acrylic resin or polycarbonate. Each holder 30 comprises a plate-like body 31 extending in parallel with the surface of the switch board 20 and three support members 32 projecting over the surface of the body 31 on this side. The holders 30 are secured to the switch board 20 such that predetermined gaps are allowed from the switch board 20 by engaging claws (not shown) provided on back faces of the bodies 31.

Figure 3:
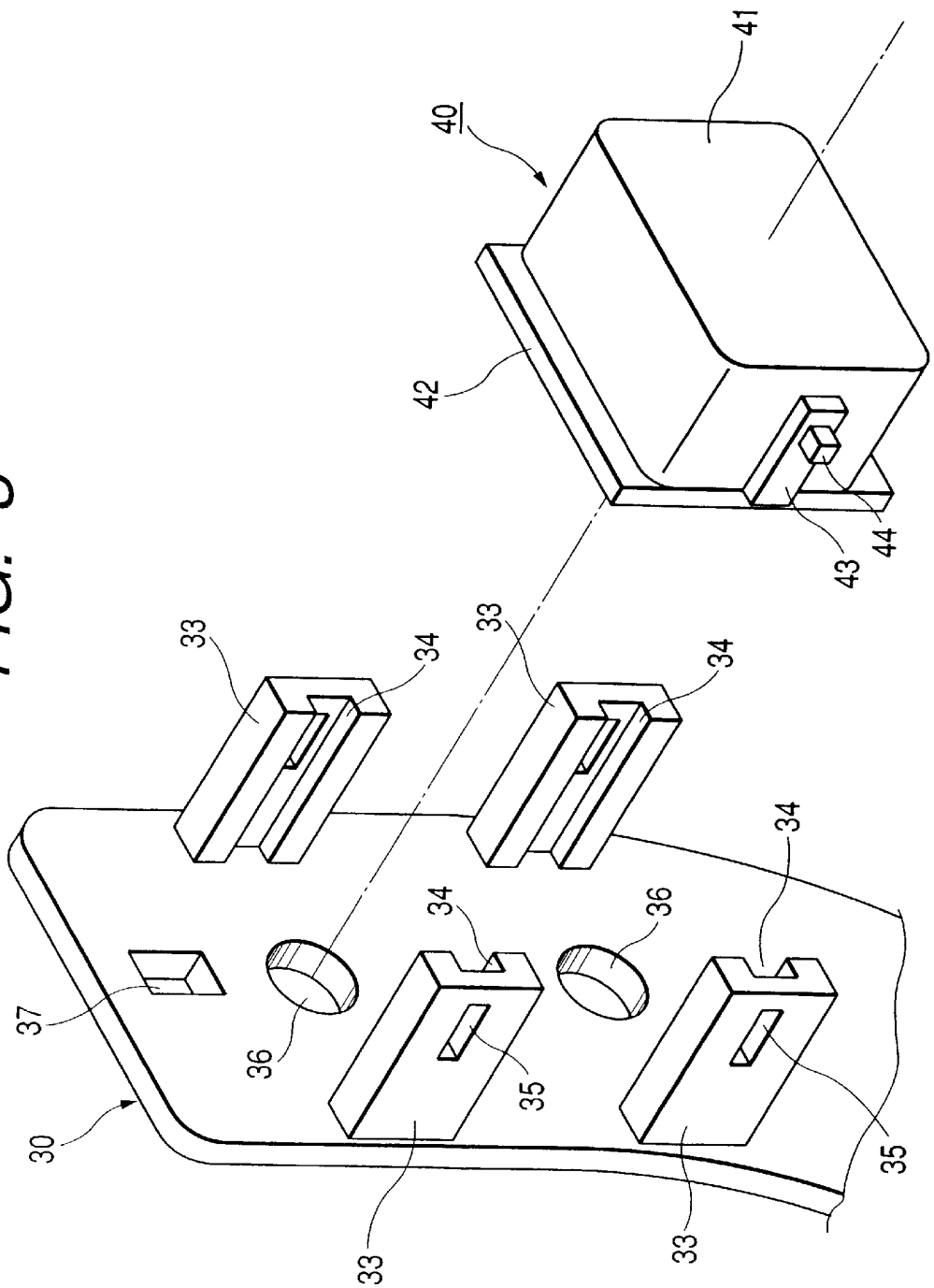
FIG. 3 is an enlarged perspective view showing the holders and the operation buttons shown in FIG. 2.

The support members 32 are constituted by a pair of guide arms 33 disposed opposite to each other such that a predetermined gap which is substantially the same as the width of the operation buttons 40 is permitted, as shown in FIG. 3. Guide grooves 34 are formed in the inner walls of the guide arms 33 so as to extend in a direction in which the switches 21 are pressed. Engaging through holes 35 are formed in the bottom surfaces of the guide grooves 34 for securing the operation buttons 40 to prevent them from separating therefrom.

Figure 4:
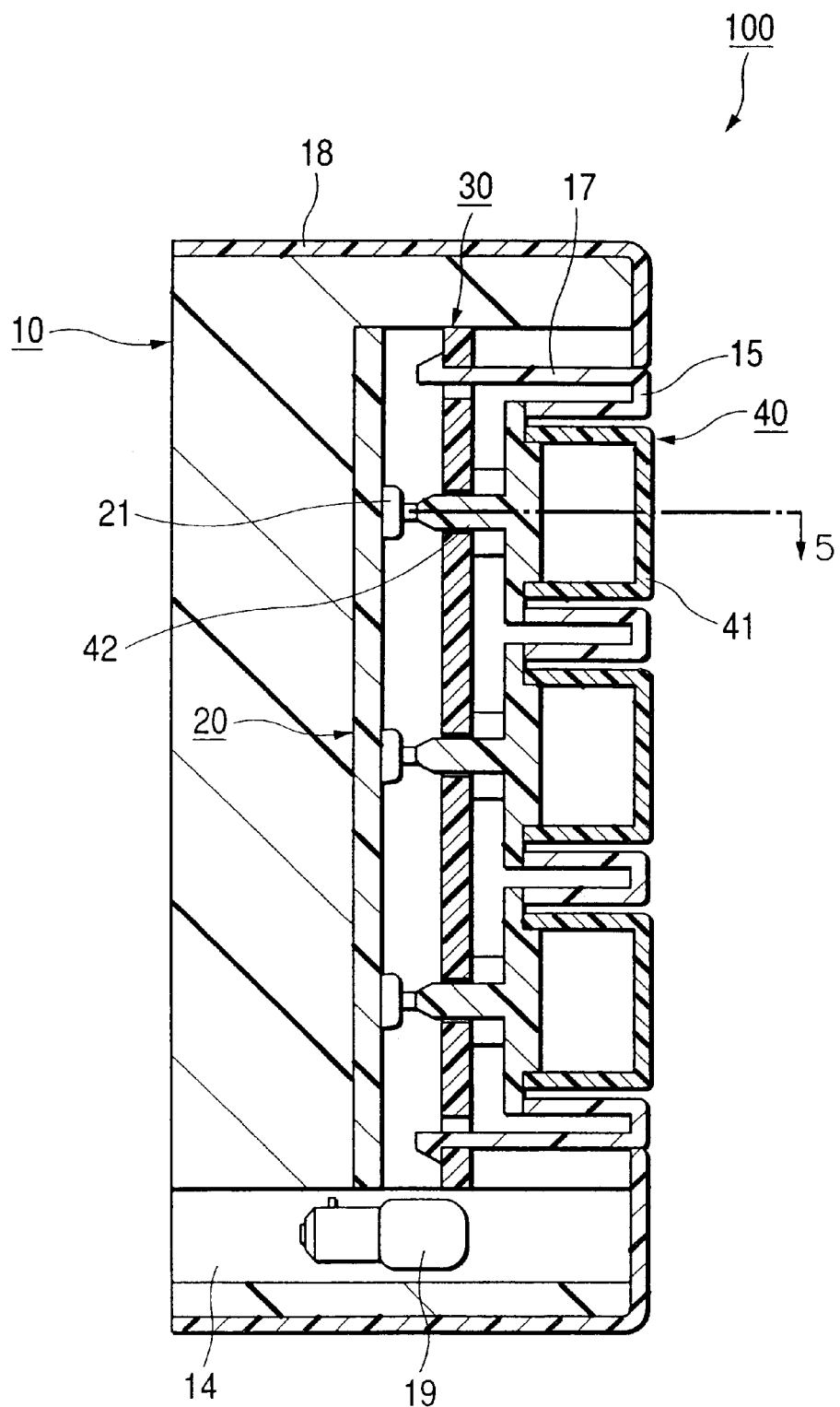
FIG. 4 is a cross sectional view showing an assembled state of the steering switch module shown in FIG. 1.

As shown in FIGS. 3 and 4, the operation buttons 40 are obtained by injection-molding a transparent resin material, such as acrylic resin or polycarbonate, similarly to the holders 30. The operation button 40 comprises a key top 41 and a pushing pin 42 attached to that portion in the rear of the key top 41. The pushing pins 42 are respectively inserted into pushing-pin insertion through holes 36 formed in the bodies 31 of the holders 30. To operate the switch 21 projecting over the switch board 20, a driver presses the key top 41 so that the leading end of the pushing pin 42 presses the switch 21.

On both side faces of the key top 41, engaging projections are provided respectively and to be slidably engaged into the guide grooves 34 formed in the support members 32 of the holders 30. On the surface of the each engaging projections 43, there is provided a stopper projection 44 which is capable of moving in associated engaging hole 35 formed in the respective guide grooves 34.

When the engaging projections 43 of the operation buttons 40 are engaged to the inside portions of the guide grooves 34 of the holders 30, the operation buttons 40 are slidably supported by the holders 30 in a direction in which the switches 21 are pressed. At this time, the stopper projections 44 of the operation buttons 40 are introduced into the engaging holes 35. Therefore, undesirable separation of the operation buttons 40 from the support members 32 of the holders 30 can be prevented.

A process for assembling the steering switch module 100 according to the present embodiment structured as described above will now be described with reference to FIGS. 1 to 3.

When the steering switch module 100 according to the present embodiment is attached to the pad 10, the switch board 20 is inserted into the groove 12 in the pad 10. The connectors 22 of the switch board 20 thereby penetrate the slits 13 so that the connectors 22 are engaged with the pad-side connectors 10a. Then, the pair of holders 30 having the support members 32 to which the operation buttons 40 are attached are secured to the switch board 20 by engaging claws (not shown) provided on the back side of the bodies 31. While the key tops 41 of the operation buttons 40 are being received in through holes 16 formed in the holding frames 15, engaging legs 17 of the holding frames 15 are engaged to securing holes 37 of the holders 30. Thus, the holding frames 15 are secured to the holders 30. Finally, the pad sheet 18 is placed to cover the pad 10 so that the steering switch module 100 for a steering wheel is assembled.

When the steering switch module 100 according to the present embodiment is decomposed when a maintenance operation is performed, jigs or the like are used to perform a reverse process. Thus, the decomposition can easily be performed.

Illumination for the operation buttons 40 during the night will now be described.

As shown in FIG. 4, electric power is supplied to the bulb 19 accommodated in the bulb receiving hole 14 of the pad 10. Thus, light beams emitted from the bulb 19 are transmitted to the operation buttons 40 through the holders 30 molded from the transparent resin material.

Since the guide grooves 34 of the holders 30 and the engaging projections 43 of the operation buttons 40 shown in FIG. 3 are slidably engaged to one another, large areas of contact can be realized between the holders 30 and the operation buttons 40. As a result, the light beams transmitted to the guide arms 33 of the holders 30 can reliably be transmitted to the operation buttons 40.

Figure 5:
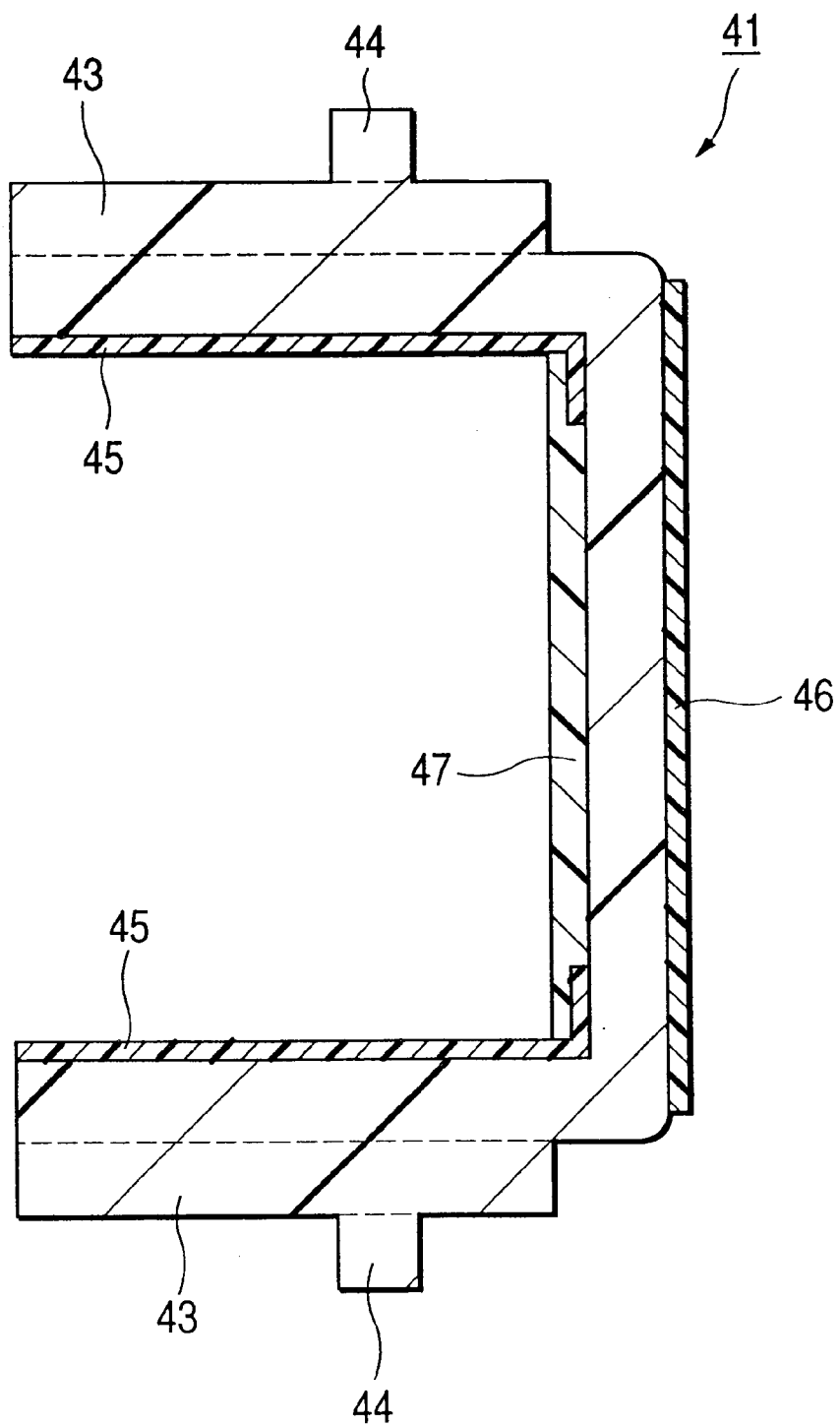
FIG. 5 is a sectional view of the key top shown in FIG. 4.
Figure 6:
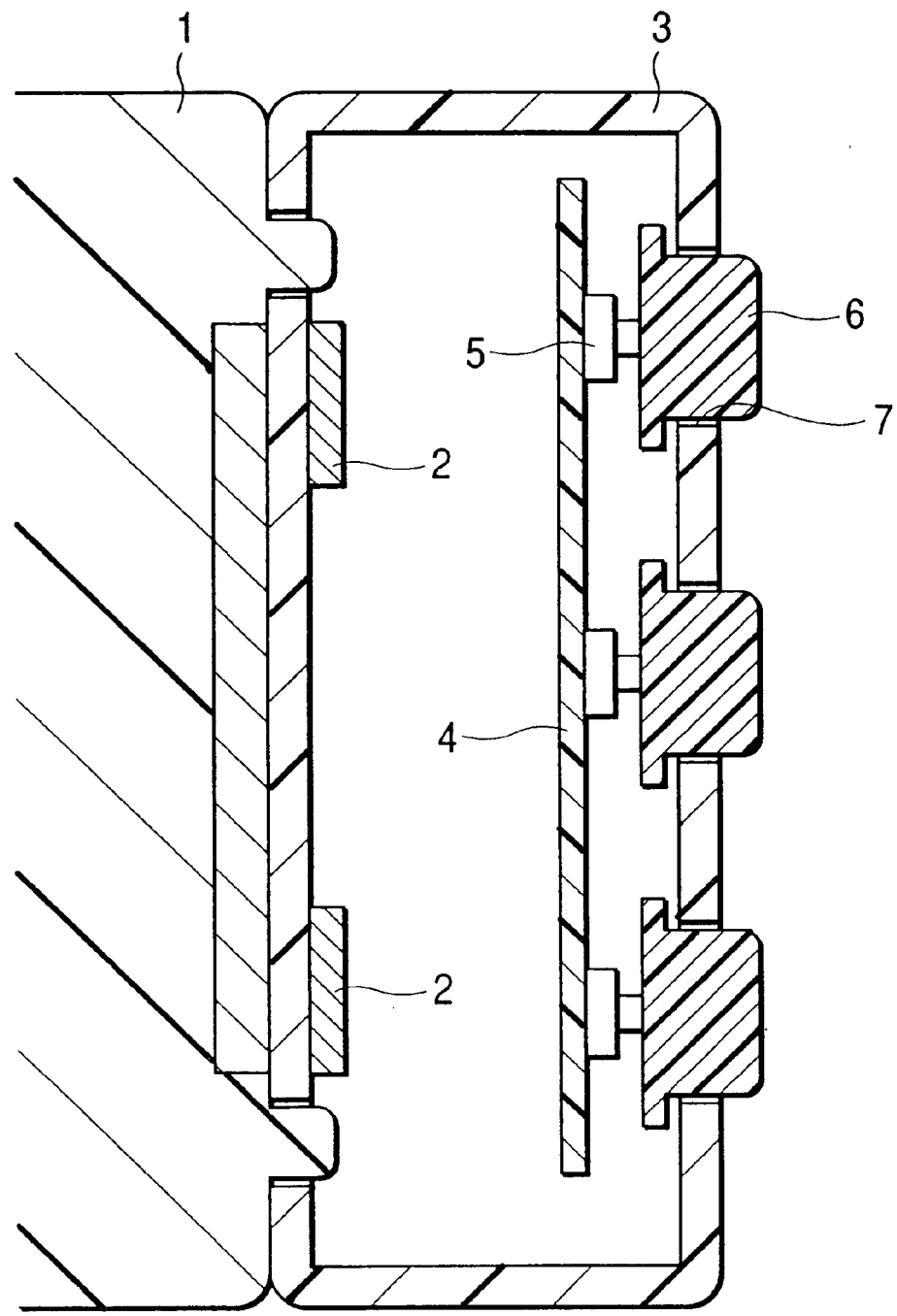
FIG. 6 is a sectional view showing a conventional steering switch module.

As shown in FIG. 5, right and left inner wall surfaces 45 of the key top 41 are painted in black, a reverse side 47 of an operation face 46 is painted in white and the operation face 46 is smoke-painted. As a result, since light beam emitted from the bulb 19 can be transmitted effectively, the overall operation face 46 can be illuminated uniformly during the night. Since pictographs provided on the operation face 46 can reliably be illuminated during the night, the operability of the operation buttons 40 by the driver can reliably be improved.

As described above, the steering switch module 100 according to the present embodiment has the structure that the plural operation buttons 40 which are operated by the driver are supported by the holders 30. Moreover, the holders 30 are secured to the switch board 20. Therefore, the operation buttons 40 can easily be attached to the pad 10. Thus, undesirable separation of the operation buttons 40 occurring when an attaching/detaching operation is performed can be prevented. Since the holders 30 are secured to the switch board 20, the plural operation buttons 40 can collectively be attached. As a result, the attaching/detaching operation can significantly easily be performed.

The holders 30 and the operation buttons 40 are molded from the transparent resin to permit light beams emitted from the bulb 19 to be transmitted from the bodies 31 of the holders 30 to the key tops 41 through the guide arms 33 and the engaging projections 43 of the operation buttons 40. Therefore, the light beams for the night illumination can uniformly be transmitted to the plural operation buttons 40. The guide grooves 34 formed in the holders 30 and the engaging projections 43 provided on the operation buttons 40 are slidably engaged to one another. Therefore, the contact areas of the holders 30 and the operation buttons 40 can be enlarged. As a result, light beams for night illumination transmitted to the support members 32 of the holders 30 can reliably be transmitted to the operation buttons 40.

As a matter of course, the present invention is not limited to the foregoing embodiment and a variety of modifications are permitted without departing from the scope and spirit of the invention.

For example, it can be adopted a configuration in which the guide grooves are formed on the operation buttons and the engaging projections for engaging with the associated guide grooves are provided on the support portions of the holders.

The foregoing embodiment is structured such that the six operation buttons 40 in total are supported by the pair of the holders 30. The present invention may be applied to a structure in which the pair of holders 30 are integrated or another structure in which operation buttons 40, the number of which is larger than six, are supported.

The holders 30 may directly be attached to the pad 10 in place of joining the same to the switch board 20.

A LED or the like may be substituted for the bulb 19.

As had been described heretofore, steering switch module according to the present invention comprises: a switch board having a plurality of switches secured to the steering wheel; a plurality of operation buttons for pressing the corresponding switches; support members for supporting the corresponding operation buttons such that the operation buttons can be displaced in a pressing direction; and holders having bodies for securing the support members such that the support members cannot relatively be displaced with respect to the switch board.

Namely, steering switch module according to the present invention has the structure that the plural operation buttons which are operated by a driver are supported by the holders. Moreover, the holders are attached to the switch board which is secured to the steering wheel portion. Therefore, separation of the operation buttons occurring when an attaching/detaching operation is performed can reliably be prevented. Moreover, the plural operation buttons can collectively be secured to the steering wheel portion. As a result, the attaching/detaching operation can significantly easily be performed.

Further, the holders and the operation buttons are made of a material having light transparency which is capable of transmitting light beams emitted from a light emitting member to the operation buttons through the bodies and the support members. Therefore, the holders serve as light transmissive plates. Moreover, the operation buttons permit light transmission. Thus, light beams for the illumination during the night can uniformly be transmitted to the plural operation buttons.

Figure 7:
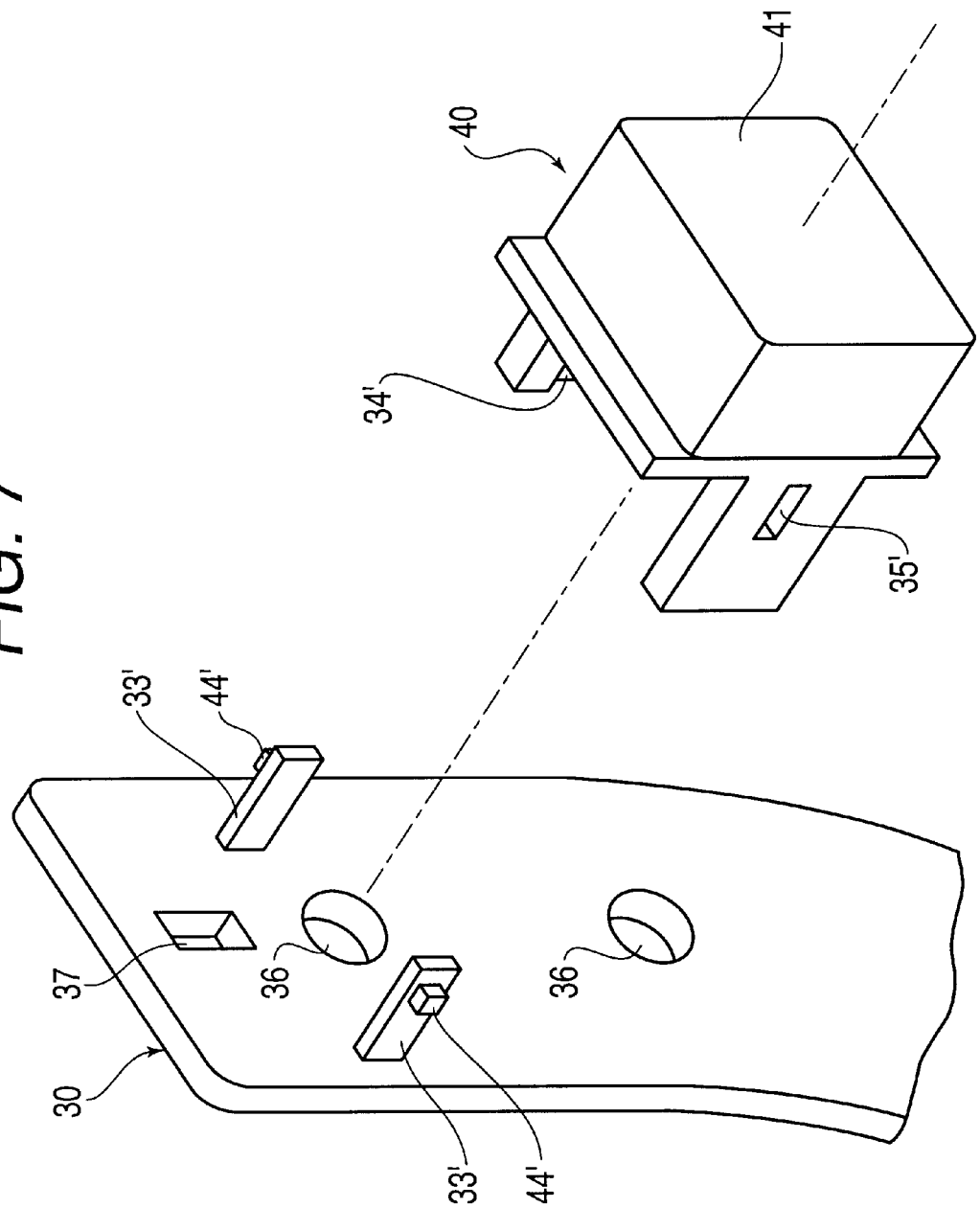
FIG. 7 is an enlarged perpendicular view showing an alternative embodiment of the invention.

Still further, one of the support members and the operation buttons have guide grooves extending in the pressing direction of the operation buttons, and the others have engaging projections which are slidably engaged into the guide grooves. FIG. 7 shows such a reverse arrangement. Guide grooves 34' are provided in the operation button 40. Engaging projections 44', to be engaged with engagement holes 35' provided within the guide grooves 34', are provided in the support members 33'. Therefore, the contact areas of the holders and the operation buttons can be enlarged. As a result, light beams transmitted to the support members of the holders can reliably be transmitted to the operation buttons. Therefore, not only the attaching/detaching operation with respect to the steering wheel can easily be performed, but also illumination of the operation buttons during the night can easily and effectively be performed.

What is claimed is:

1. A steering switch module mounted on a steering wheel for controlling electronic equipment disposed on a vehicle comprising:

a switch board on which a plurality of operation switches are provided to control the electronic equipment;

a plurality of operation buttons for facilitating actuation of the operation switches;

a holding member secured to said switch board for retaining the operation buttons to the switch board in such a manner that the operation buttons are slidable along said holding member only in a press-operation direction; and a steering cover for covering the switch board and the holding member such that only the operation buttons are exposed.

2. A steering switch module mounted on a steering wheel for controlling electronic equipment disposed on a vehicle comprising:

a switch board on which a plurality of operation switches are provided to control the electronic equipment;

a plurality of operation buttons for facilitating actuation of the operation switches;

a holding member secured to said switch board for retaining the operation buttons to the switch board in such a manner that the operation buttons move only in a press-operation direction; and a steering cover for covering the switch board and the holding member such that only the operation buttons are exposed, wherein the holding member includes a holder having support members for respectively supporting the operation buttons and a holding frame for retaining the operation buttons collectively.

3. The steering switch module as set forth in claim 2, wherein guide grooves are formed in one of the support members and the operation buttons, and engaging projections for slidably engaging with the associated guide grooves are provided on the other.

4. The steering switch module as set forth in claim 2 further comprising:

a light source for illuminating the operation buttons, wherein the holder and the operation buttons are made of a transparent medium.

5. The steering switch module as set forth in claim 4, wherein guide grooves are formed in one of the support members and the operation buttons, and engaging projections for slidably engaging with the associated guide grooves are provided on the other.

6. The steering switch module as set forth in claim 4, wherein a coating is applied to each of the operation buttons so as to form an optical path such that a light beam emitted from the light source is capable of illuminating an operation face of the operation switch uniformly.

7. The steering switch module as set forth in claim 6, wherein the operation buttons include side walls which contact with the support members and wherein inner surfaces of the side walls have a black coating, a reverse surface of the operation face has a white coating, and the operation face is smoke-painted.

* * * * *